United States Patent [19]

Ruprecht

[11] 4,030,275
[45] June 21, 1977

[54] ROTARY MOWER

[75] Inventor: Hermann Ruprecht, Singen, Hohentwiel, Germany

[73] Assignee: Maschinenfabrik Fahr Aktiengesellschaft, Gottmadingen, Germany

[22] Filed: Jan. 12, 1976

[21] Appl. No.: 648,099

[30] Foreign Application Priority Data

Jan. 16, 1975 Germany ............................ 2501642

[52] U.S. Cl. ................................................ 56/192
[51] Int. Cl.² ......................................... A01D 57/30
[58] Field of Search .......... 56/192, 6, DIG. 1, 13.6, 56/14.5

[56] References Cited

UNITED STATES PATENTS

| | | | |
|---|---|---|---|
| 2,344,663 | 3/1944 | Wood ............................. | 56/192 X |
| 3,772,865 | 11/1973 | Ruprecht et al. .................... | 56/192 |
| 3,940,913 | 3/1976 | Wallenfang et al. ........... | 56/14.5 X |

*Primary Examiner*—J.N. Eskovitz
*Attorney, Agent, or Firm*—Karl F. Ross; Herbert Dubno

[57] ABSTRACT

A rotary mower has a cylindrical drum rotatable about its upright vertical axis and provided at its lower end with a downwardly and outwardly flared skirt provided on its lower side with radially projecting crop-cutting blades and on its upper side with crop-displacing ridges. A windrow-forming deflecting plate is fixed on the support of the mower adjacent the drum and has a lower edge parallel to the upper surface of the skirt and forming on juxtaposition of this lower edge with the leading edge of each of the crop-displacing ridges an outwardly open acute angle. The ridge may be pressed into the skirt or constituted as a bar secured to the top thereof and has a circularly arcuate leading edge that passes under the straight lower edge of the deflecting plate.

9 Claims, 3 Drawing Figures

U.S. Patent   June 21, 1977   4,030,275
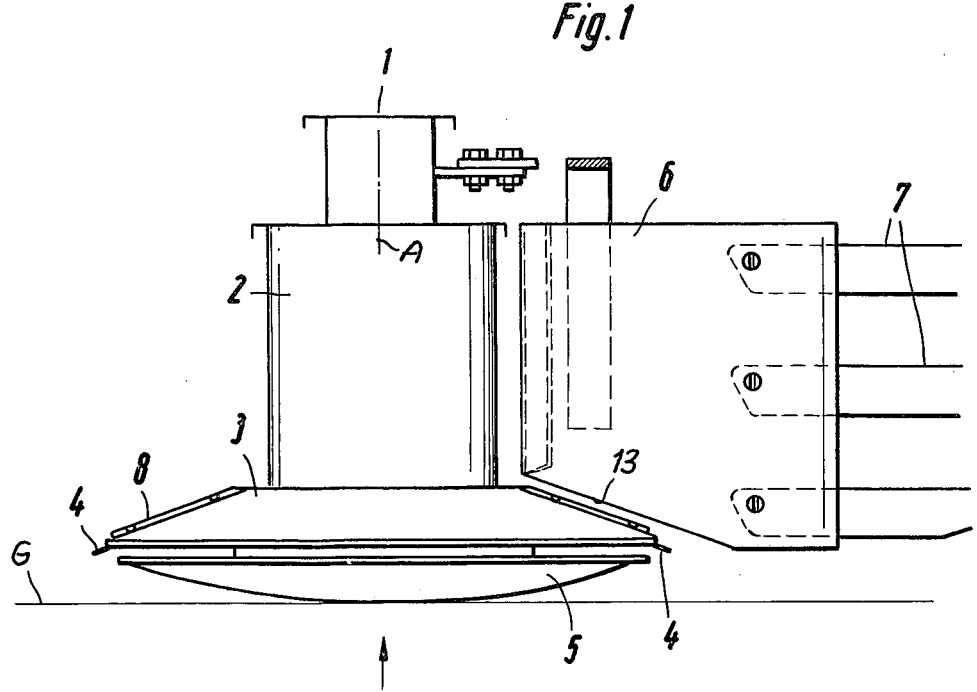
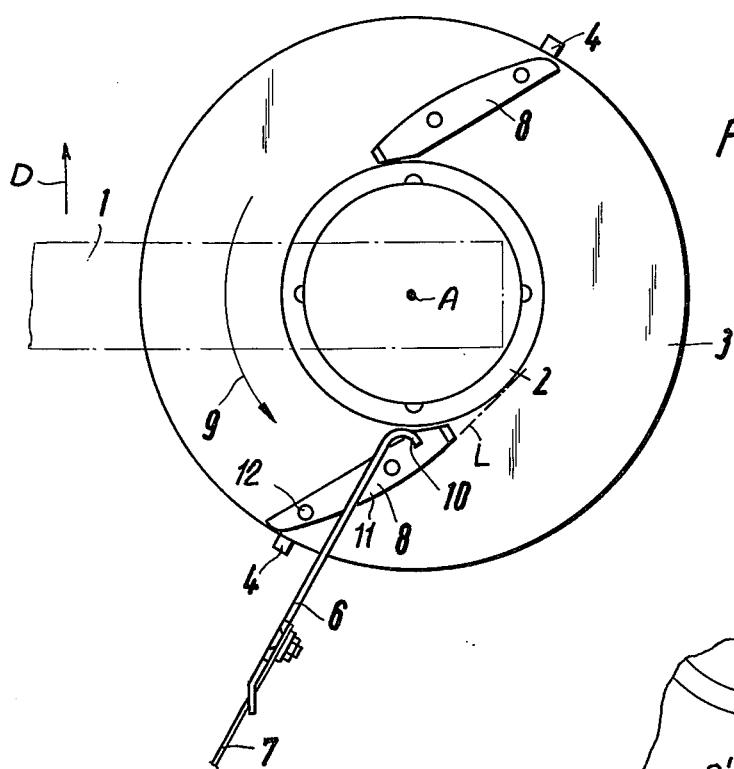
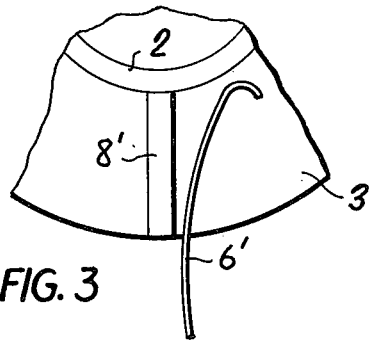

ROTARY MOWER

FIELD OF THE INVENTION

The present invention relates to a rotary mower. More particularly this invention concerns such a mower having a support displaceable along the ground and carrying at least one mower drum rotatable about a vertical axis and provided on its lower region with a skirt carrying crop-cutting blades.

BACKGROUND OF THE INVENTION

A rotary mower of the above-described general type is usually provided with a deflecting plate adjacent each of the mower assemblies. This plate is generally flat and upright, having a lower edge closely juxtaposed with the upper surface of the skirt of the mower assembly.

In order to mow the cut crop back toward the plate to form a windrow the top of the skirt is formed with radially extending ridges. As the drum rotates, the ridges orbit and pass closely beneath the lower edge of the deflecting plate, extending parallel to this lower edge at the point of closest approach of the two edges. The provision of such a ridge or ridges on the skirt aids in moving the cut crop back into a windrow, and largely prevents the crop from passing through between the deflector plate and the skirt.

The disadvantage of such an arrangement is that it often leads to blockages of the mower assembly so that the mowing operation must be halted and the operator must descend from the tractor or the like pulling the mower and clear the jam. In addition the cut crop, particularly when it is of the long-stem type, is moved with considerable violence so that it is often damaged. Furthermore the crop bunched up behind the ridge is thrown all at once against the deflecting plate so that this plate is frequently bent back after only a short time in service.

OBJECTS OF THE INVENTION

It is therefore an object of the present invention to provide an improved rotary mower.

Another object is the provision of such a mower wherein the above-given disadvantages are overcome.

SUMMARY OF THE INVENTION

These objects are attained according to the present invention in a rotary mower as described above wherein the ridge on the skirt forms with the lower edge of the deflecting plate on juxtaposition of these two edges an acute angle opening generally radially of the upright rotation axis of the mowing drum. Thus when the two edges are close to one another at the instant before the leading edge of the ridge crosses underneath the lower edge of the plate they form an outwardly open acute angle. This arrangement ensures that the cut crop is propelled radially outwardly at the deflecting plate. Thus winding-up of long crop stalks around the drum is avoided. Furthermore the crop bunched up at this deflecting ridge does not strike the deflecting plate all at once. The cut crop is propelled at least partially radially outwardly by the coacting deflector plate and ridge.

In accordance with another feature of this invention the leading edge of the ridge or the bottom edge of the deflector plate is arcuate so that the angle formed between these two edges remains the same as they cross one another. In accordance with this invention an imaginary curved extension of the curved edge is generally tangential to the cylindrical wall of the drum carrying the skirt.

According to yet another feature of this invention the leading edge of the ridge has substantially the shape of a circular arc so that the effective length of the ridge increases outwardly from the center of rotation of the drum. The ridge according to this invention may be formed directly in the skirt by stamping, or may constitute a separate element secured to this skirt.

According to a further feature of this invention the vertical edge of the deflecting plate is circularly arcuate in the rotation direction of the drum. This arrangement prevents the crop from jamming up at this vertical edge of the plate toward the drum. The severed stems of the crop do not get caught on this sharp vertical edge of the plate but are more likely to be conducted away from this plate back into the windrow.

BRIEF DESCRIPTION OF THE DRAWING

FIG. 1 is a side view of the mower in accordance with this invention;

FIG. 2 is a top view of the arrangement shown in FIG. 1; and

FIG. 3 is a top view of a detail of another arrangement in accordance with the present invention.

SPECIFIC DESCRIPTION

The arrangement shown in FIGS. 1 and 2 has a support 1 adapted to be moved along the ground G in a direction of displacement D. A vertically cylindrical drum rotatable on the support about an axis A is provided at its lower end with an outwardly flared skirt 3 and underneath this skirt 3 with a downwardly convex plate 5 that rides along the ground G and supports the drum 2. Such a structure is described in commonly assigned U.S. Pat. No. 3,772,865. Bolted underneath the downwardly flared and upwardly tapering skirt 3 on diametrically opposite sides are radially extending blades 4 that serve to cut the crop in front of the mowing arrangement adjacent the ground.

Secured via rivets 12 to the top of this skirt 3 above each of the blades 4 is a deflector ridge 8 having relative to the rotation direction 9 of the drum 2 about the axis A a leading edge 11 which is generally circularly arcuate and forms a continuation of a line L that is tangent to the outer surface of the drum 2.

The support carries behind the drum 2 relative to the direction D a windrow-forming deflector plate 6 to which are attached horizontal windrow-forming tines 7. The lower edge 13 of this plate 6 is straight and lies parallel to and spaced slightly above the upper surface of the skirt 3. The deflecting ridges 8, here formed by short metal plates or bars secured to the top of the skirt 3, pass underneath this edge 13 and form with it an outwardly open acute angle. The upright edge 10 of the otherwise planar plate 6 is part-cylindrical and bent back from the rotation direction 9.

As the mower drum 2 rotates, the blades 5 cut the crop in front of the mower at its base and the ridges or bars 8 carry the cut crop back toward the plate 6. As the cut crop is pushed against the plate 6 it also receives from the spirally extending leading edge 11 of the bars 8 an outward component that prevents it from jamming up against the plates 6 and pushes it back into a windrow.

FIG. 3 shows how a curved plate 6' may be used along with a straight ridge 8'. In this case the ridge 8' is formed directly in the skirt 3 by stamping.

I claim:
1. A rotary mower comprising:
   a support displaceable along the ground;
   a drum suspended from said support and rotatable relative thereto about an upright axis in a rotation sense;
   a downwardly flared skirt on said drum;
   a deflector plate secured to said support and having a lower edge spaced above and extending generally parallel to said skirt;
   a ridge on said skirt displaceable on rotation of said drum underneath said lower edge, said ridge having a leading edge sweeping past said plate on rotation of said drum and juxtaposable with said lower edge, said edges including an acute angle between them upon juxtaposition of said edges; and
   at least one blade secured to said skirt and extending generally radially therefrom.
2. The mower defined in claim 1 wherein at least one of said edges is so shaped that on passage of said leading edge under said lower edge, said edges always form substantially the same angle.
3. A rotary mower comprising:
   a support displaceable along the ground;
   a drum suspended from said support and rotatable relative thereto about an upright axis in a rotation sense;
   a downwardly flared skirt on said drum;
   a deflector plate secured to said support and having a lower edge spaced above and extending generally parallel to said skirt;
   a ridge on said skirt displaceable on rotation of said drum underneath said lower edge, said ridge having a forwardly convex leading edge sweeping past said plate on rotation of said drum and juxtaposable with said lower edge, said edges including an acute angle between them upon juxtaposition of said edges; and
   at least one blade secured to said skirt and extending generally radially therefrom, at least one of said edges being so shaped that on passage of said leading edge under said lower edge, said edges always form substantially the same angle.
4. The mower defined in claim 3 wherein a continuation of said leading edge is tangential to said drum.
5. The mower defined in claim 3 wherein said leading edge is circularly arcuate.
6. The mower defined in claim 3 wherein said lower edge is straight.
7. The mower defined in claim 3 wherein said ridge is formed by a rigid element secured to said skirt.
8. The mower defined in claim 3 wherein said ridge is integral with said skirt.
9. The mower defined in claim 3 wherein said plate has an upright edge parallel to said drum and to said axis and bent cylindrically back in said sense.

* * * * *